N. HUBBARD.
AUTOMATIC STOP AND CHECK VALVE.
APPLICATION FILED JULY 5, 1913.
1,153,226.
Patented Sept. 14, 1915.
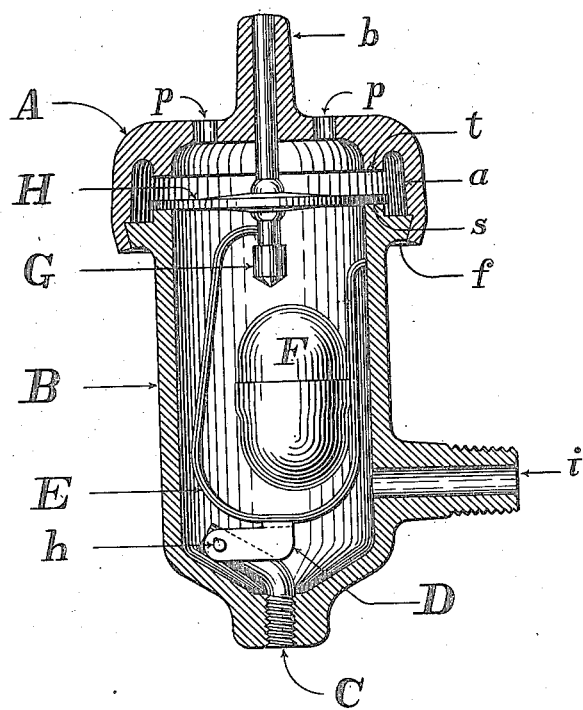
WITNESSES:
INVENTOR
Norman Hubbard

UNITED STATES PATENT OFFICE.

NORMAN HUBBARD, OF ELIZABETH, NEW JERSEY.

AUTOMATIC STOP AND CHECK VALVE.

1,153,226.   Specification of Letters Patent.   Patented Sept. 14, 1915.

Application filed July 5, 1913. Serial No. 777,423.

*To all whom it may concern:*

Be it known that I, NORMAN HUBBARD, a citizen of the United States, residing at Elizabeth, in the county of Union and State of New Jersey, have invented a new and useful Automatic Stop and Check Valve, of which the following is a specification.

My invention relates to improvements in automatic stop and check valves in which a disk operates between two seats; and the objects of my improvements are; first, to permit the escape through the valve of air or gas at or below a given temperature; second, to prevent the escape of air, gas or steam at a higher than the given temperature; third, to prevent the escape of any liquid; and fourth, to prevent the return into the valve of air or any gas or substance.

According to my invention, the closing of the valve is in any case effected by fluid pressure, while the movement of the valve under this influence is permitted or prevented by a control device operated on the one hand thermally and on the other hand by the buoyancy of a float member forming a part of the control device, which is affected by the water of condensation rising in the valve chamber. It will thus be seen that according to my invention the valve is in one sense pressure actuated and thermally controlled, and in another sense is pressure actuated and hydraulically controlled.

I attain these objects by the mechanism illustrated in the accompanying drawing, which is a vertical section of the entire valve.

A cylindrical body B, having a branch or inlet *i*, threaded for attachment to a vessel or pipe; terminates with a seat *s*, and has a flange *f*, on the outside. A bonnet A, mounted on the flange *f*, has a seat *t*, on the inner side opposite to and concentric with seat *s*, a boss *b*, in the center with a hole through same at right angles to the plane of the seats and port holes *p, p*, on a circle around the central boss. Within the bonnet A, and surrounding the seats *s, t*, is an annular space *a*. Between the seats *s, t*, is a disk H, mounted on a spindle G, the spindle fitting and sliding in the hole in the boss *b*, and guiding the disk H, between seats *s, t;* below the disk H, at a distance equal to that between seats, the spindle G, is enlarged to form a shoulder, length of enlarged portion being equal to or greater than distance between seats *s, t*. A tongue E, having one end resting against inside of the body B, and the other end terminating in a hook resting against the spindle G, between shoulder on same and disk H, admits of the disk H, and spindle G, being raised from the seat *s*, by pressure from within the valve, while by engaging the shoulder on the spindle G, it prevents disk H, from closing against the seat *t*.

The tongue E, previously referred to, is composed of two substances having different coefficients of expansion, that having the greater being on the inside, so that when subjected to heat the extremities separate, disengaging the shoulder on the spindle G, and allowing the disk H, to close against the seat *t*, thus closing the valve. The tongue E, is mounted on a clevis D, attached to a post C, screwed into valve body; a pin *h*, through clevis D, and post C, forms a hinge. A float F, attached to that arm of tongue E, which rests against inside of valve body is raised when a liquid enters the valve, moving the tongue about the pin *h*, disengaging the shoulder on the spindle G, and allowing the disk H, to close against the seat *t*, thus closing the valve. The float F constitutes a tilting float device and in order to perform its function it must be pivotally engaged or anchored directly or indirectly at some point laterally spaced from its vertical axis, wherefore, it will be seen the post C is in the present embodiment bent to one side and a clevis D extends laterally of the float to pivotally engage the end of the post C. The disk H, closes against the seat *s*, when pressure from within the valve is equal to or less than that without.

I am aware that prior to my invention, automatic stop and check valves, having a disk operating between two seats, have been made; I therefore do not claim such a combination broadly; but

I claim;

1. A combined stop and check valve comprising in combination a valve movable into stop and check positions, a chamber above said valve communicating with the atmosphere, a chamber below said valve exposed to air and steam, and a thermostatic control device located in said lower chamber and normally interposed in the path of a portion of said valve for locking said valve against movement into stop position.

2. A combined stop and check valve comprising in combination upper and lower chambers having respective valve seats, a movable valve disposed between said valve seats for actuation by fluid pressure, and a thermostatic device in said lower chamber adapted to arrest seating of said valve on the upper valve seat when cold and to release said valve when hot.

3. A combined stop and check valve comprising in combination a pair of valve seats, a valve disk movably mounted between said seats with a shouldered stem, and a thermostatic control device having a thermally operated tongue normally in the path of the shoulder of said valve stem for holding the valve disk off one of its seats but adapted to release the same when heated.

4. A combined stop and check valve comprising in combination a pair of valve seats, a valve disk movably mounted between said valve seats and having a shouldered stem, and a hydraulically operated control device having a tongue normally in the path of the shoulder on said stem and automatically movable out of said path.

5. A combined stop and check valve comprising in combination a pair of valve seats, a valve movable between said seats and having a shouldered stem, a tongue adapted to engage said shouldered stem to control the movement of said valve, and a float operatively connected with said tongue for moving the same out of such engagement.

6. A combined stop and check valve comprising in combination a pair of valve seats, a valve movable between said seats, having a shouldered stem, a thermostatic tongue adapted to engage said shouldered stem, and having a tilting float device attached thereto, and a suitable pivotal connection for said tilting float device.

7. An air relief device for radiators comprising in combination a valve housing having a valve seat and a pressure fluid passage therethrough, a valve therein adapted to be seated by the pressure fluid and thermostatic means in said pressure fluid passage for normally restraining the valve from seating under the influence of the pressure fluid, but movable out of restraining position when heated by the pressure fluid.

8. An air relief device for radiators comprising in combination a valve housing having a valve seat and a pressure fluid passage therethrough, a valve therein adapted to be seated by the pressure fluid and hydraulically released means in said pressure fluid passage for normally restraining the valve from seating under the influence of the pressure fluid.

9. An air relief device for radiators comprising in combination a valve housing having a valve seat and a pressure fluid passage therethrough, a valve therein adapted to be seated by the pressure fluid and hydraulically released thermostatic means in said pressure fluid passage for normally restraining the valve from seating under the influence of the pressure fluid.

10. A combined stop and check valve device for radiators, comprising in combination a freely mounted valve normally resting in check position, and exposed to the heating fluid for pressure actuation thereby into stop position, and thermostatic means for normally arresting such actuation of said valve between stop and check positions to permit escape of air and releasing said valve for movement into said stop position when subjected to the heating fluid.

11. A combined stop and check valve for radiators comprising in combination a freely mounted valve, normally resting in check position and exposed to the pressure of the heating fluid for actuation thereby, and hydraulic means normally in position to arrest such actuation between check and stop positions and hydraulically actuated to release said valve to its further movement into stop position.

12. A combined stop and check valve for radiators, comprising in combination a freely mounted valve exposed to the pressure of the heating fluid and actuated thereby from check to stop position, and combined thermostatic and hydraulic control means normally in position to arrest said valve between check and stop positions to permit the escape of air, and adapted to release said valve in the presence of the heating fluid or water.

13. A combined stop and check valve for radiators, comprising in combination a freely mounted valve exposed on one side to the pressure of the heating fluid and on the other side to the atmosphere for actuation by heating fluid pressure and atmospheric pressure into stop and check positions respectively, and thermostatic means for controlling the actuation of said valve into stop position.

14. A combined stop and check valve for radiators, comprising in combination a freely mounted valve exposed on one side to the pressure of the heating fluid and on the other side to the atmosphere for actuation by heating fluid pressure and atmospheric pressure into stop and check positions respectively, and hydraulic means for controlling the actuation of said valve into stop position.

15. A combined stop and check valve for radiators, comprising in combination a freely mounted valve exposed on one side to the pressure of the heating fluid and on the other side to the atmosphere for actuation by heating fluid pressure and atmospheric pressure into stop and check positions respectively, and combined thermostatic and hydraulic means for controlling the actuation of said valve into stop position.

16. An air relief valve for radiators, comprising in combination a freely mounted stop valve exposed to the pressure fluid for actuation thereby into stop position, and thermostatic means normally interposed in the path of a transversely projecting portion of said valve for arresting such actuation of said valve, said means being thermostatically movable transversely out of the path of movement of said projecting portion of the valve.

NORMAN HUBBARD.

Witnesses:
M. V. A. VAN NOSTRAND,
FREDERICK R. WARREN.